Aug. 25, 1959   A. L. HENRIKSEN   2,900,774
MACHINE FOR PACKING BAGS WITH POWDERED OR GRANULATED MATERIAL
Filed Dec. 23, 1957   7 Sheets-Sheet 1

Arthur L. HENRIKSEN
INVENTOR
By Wenderoth, Lind & Ponack
Att'ys

Arthur L. HENRIKSEN
INVENTOR

By Wenderoth, Lind & Ponack
Attys

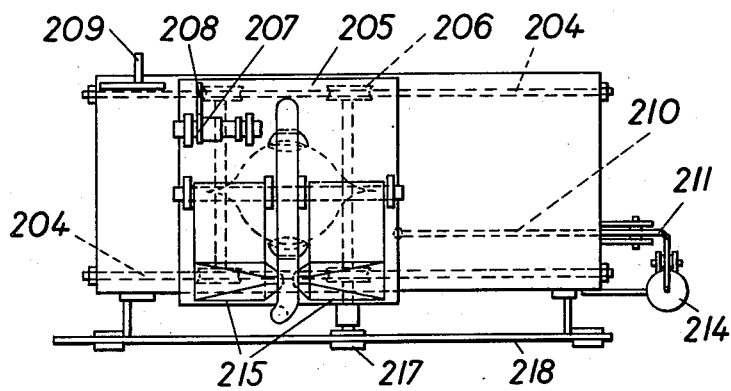
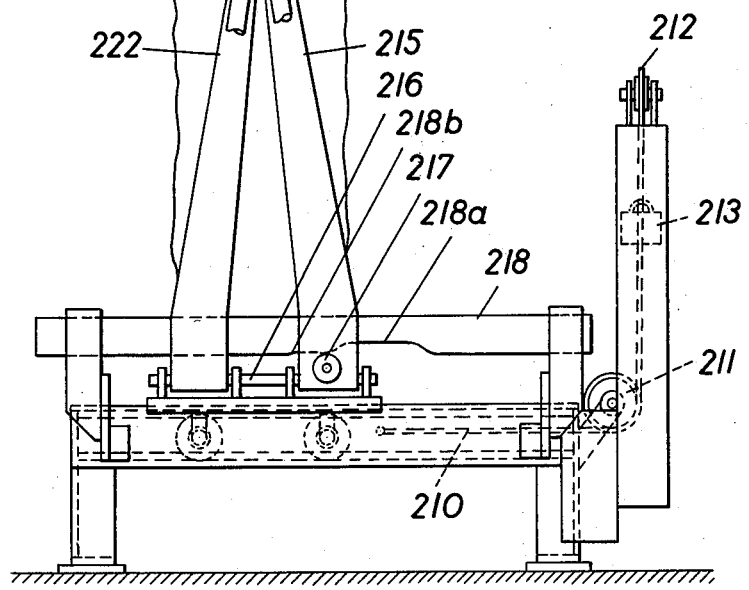

Aug. 25, 1959  A. L. HENRIKSEN  2,900,774
MACHINE FOR PACKING BAGS WITH POWDERED OR GRANULATED MATERIAL
Filed Dec. 23, 1957  7 Sheets-Sheet 5

Arthur L. HENRIKSEN
INVENTOR

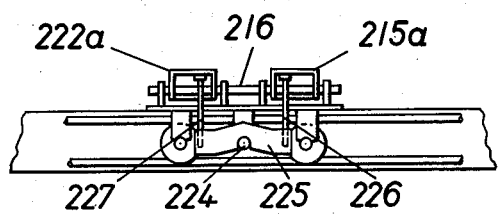
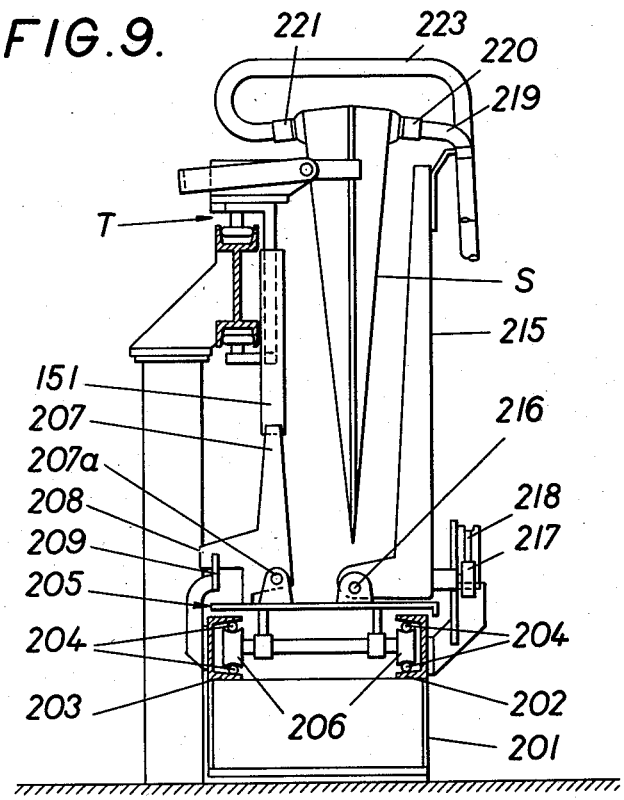

Aug. 25, 1959  A. L. HENRIKSEN  2,900,774
MACHINE FOR PACKING BAGS WITH POWDERED OR GRANULATED MATERIAL
Filed Dec. 23, 1957  7 Sheets-Sheet 7

Arthur L. HENRIKSEN
INVENTOR

By
Wenderoth, Lind & Ponack
Attys

United States Patent Office 2,900,774
Patented Aug. 25, 1959

2,900,774

MACHINE FOR PACKING BAGS WITH POWDERED OR GRANULATED MATERIAL

Arthur Lorange Henriksen, Haslum, Norway, assignor to Norsk Hydro-Elektrisk Kvaelstofaktieselskab, Oslo, Norway Application December 23, 1957, Serial No. 704,656

Claims priority, application Norway January 2, 1957

16 Claims. (Cl. 53—126)

This invention relates to apparatus for packing bags with powdered or granulated materials. The term "packing" is used in the following specification and the appended claims to describe the filling of bags with materials, sealing bag openings by means of sewing, heat sealing or other permanent sealing and eventually by further tightening of the seam holes. The term "powdered" is used also to include "granulated" materials, the only condition being that grain size is chosen in such a way that the material is able to flow through the appropriate apertures and channels.

One object of this invention is the packing of materials containing at least a certain portion of finely divided powder, said powder being able to flow through very small bag apertures, e.g. through seam holes. The invention includes means to seal such apertures completely and to render the bags vapor tight. The invention is not limited, however, to the packing of such materials.

A principal object of this invention is the packing of goods into multiwall bags, although the apparatus according to the invention may be utilized for bags of other materials.

It is known, when filling powdered materials into bags, that one can use a frame structure rotatable about a vertical axis and carrying an upper, centrally positioned reservoir for the materials to be packed, providing said reservoir with a number of discharge funnels for the material, and disposing an automatic dispensing device below each funnel supported by the frame structure, said dispensing device being able to discharge the materials in portions of predetermined weight into a hopper situated below the device and supported also by the frame structure, the material flowing down from the lower discharge mouth of the hopper into a bag arranged below the hopper.

Such a device is employed also in the machine according to the present invention. The construction of said device being known, it is not necessary to describe it in detail, and its description will be limited only to the details which are necessary to understand the invention. Apart from said device, the machine also comprises a sewing machine or another device for permanently sealing the fluid bags. If a sewing machine is used, it may be of a known construction, but as disclosed later, it must then be especially mounted and operated in order to work satisfactorily in a machine according to the invention.

The invention comprises a combination of a filling device of the above named character with an apparatus for permanent sealing of the filled bags, in the following termed "sealing apparatus" or "sealing machine," the combination working in such a way that the bags may be automatically conducted through the filling device and the sealing apparatus. It has been found that such a combination is very difficult to realize. The reason is principally that the bag to be filled must be open at the top, i.e. the lateral walls of the bag must be spaced apart at the top, while the upper edges, when the bag is to be sealed, must be closely aligned.

This difficulty is solved according to this invention primarily by suspending the empty bags in holders, provided with clamps gripping the opposite lateral edges of the bags and adapted to be moved to and fro, with respect to each other, said holders being fastened to trucks travelling on rails arranged in a closed path around the filling device and behind the sealing machine.

Another feature of the present invention consists of a number of such trucks being connected to each other to form an endless truck chain. Alongside the rail guiding cams are arranged cooperating with cam opening and locking mechanisms and with mechanisms moving the cams to and fro with respect to each other.

The machine, according to this invention, is provided with a transport device for the bags, consisting of a number of trucks connected to each other to form an endless truck chain, and a rail on which the trucks travel in a closed longitudinal path, each truck being provided with a bag holder having two clamps arranged at approximately the same height, said clamps being adapted to be moved parallel to the travel direction of the trucks from an outer position, in which they are somewhat less spaced than the width of the bag being filled, to an inner position in which they are considerably less spaced, said clamps being further adapted to grip, when situated in the outer position, a bag to be guided into the clamps by its opposite lateral edges, the bag holders being connected with mechanisms which partly open and lock the clamps and partly move the clamps to and fro relative to each other, the said mechanisms being arranged to be guided by stationary guiding cams, placed in the vicinity of the rail and constructed in such a way that a bag fastened in a holder, will be carried by the truck to one of the aforementioned hoppers with the clamps in their inner position, and said bag after being filled with goods of predetermined weight, by the truck is further guided to the sealing machine with the clamps in their outer position, the bag being suspended in the clamps both during the filling operation and during the sealing operation.

Directly forward of the spot where the bag holder is guided below a filling hopper for the bag, there is arranged according to another feature of this invention, a bag opener adapted to open a bag suspended in clamps upon a truck, i.e. to move the upper edges of the bag apart in such a manner that the goods discharged through the hopper orifice flow down into the bag.

Another feature of this invention consists of arranging between the place where the bag is being filled and the sealing apparatus, a shaking apparatus situated below the truck path at such a height that a filled bag, which is suspended in the clamps, will rest against the shaking apparatus, the goods being shaken thereby and packed together in the bag.

Behind the sealing apparatus there is arranged a bath containing a tightening medium, for instance molten wax disposed along the travel direction of the trucks, and guides which bend down the closed upper edge of the bag situated above the clamps into the bath, in order to apply tightening medium on the edge, and thereafter bend it up from the bath. A wax bath disclosed in my copending application (Serial No. 704,778, filed December 23, 1957) may be suitably used.

At the portion of the rail which, in the direction of the travel of the trucks, follows the sealing apparatus and the sealing bath, if such a bath is used, there is further preferably arranged a conveyor adapted to transport the filled and sealed bags away, a guiding cam adapted to open the clamps and being arranged in such a manner that the bag is being dropped when arriving into its position above the conveyor.

Various other features of the invention will appear from the following description in connection with the accompanying drawings, these illustrating a preferred embodiment of an apparatus according to the invention.

Figs. 7, 8 and 9 are a plan elevation, a side elevation and a front elevation of a bag opener respectively.

Fig. 10 is a front elevation of details of the bag opener.

The general construction of the machine

Figure 1:
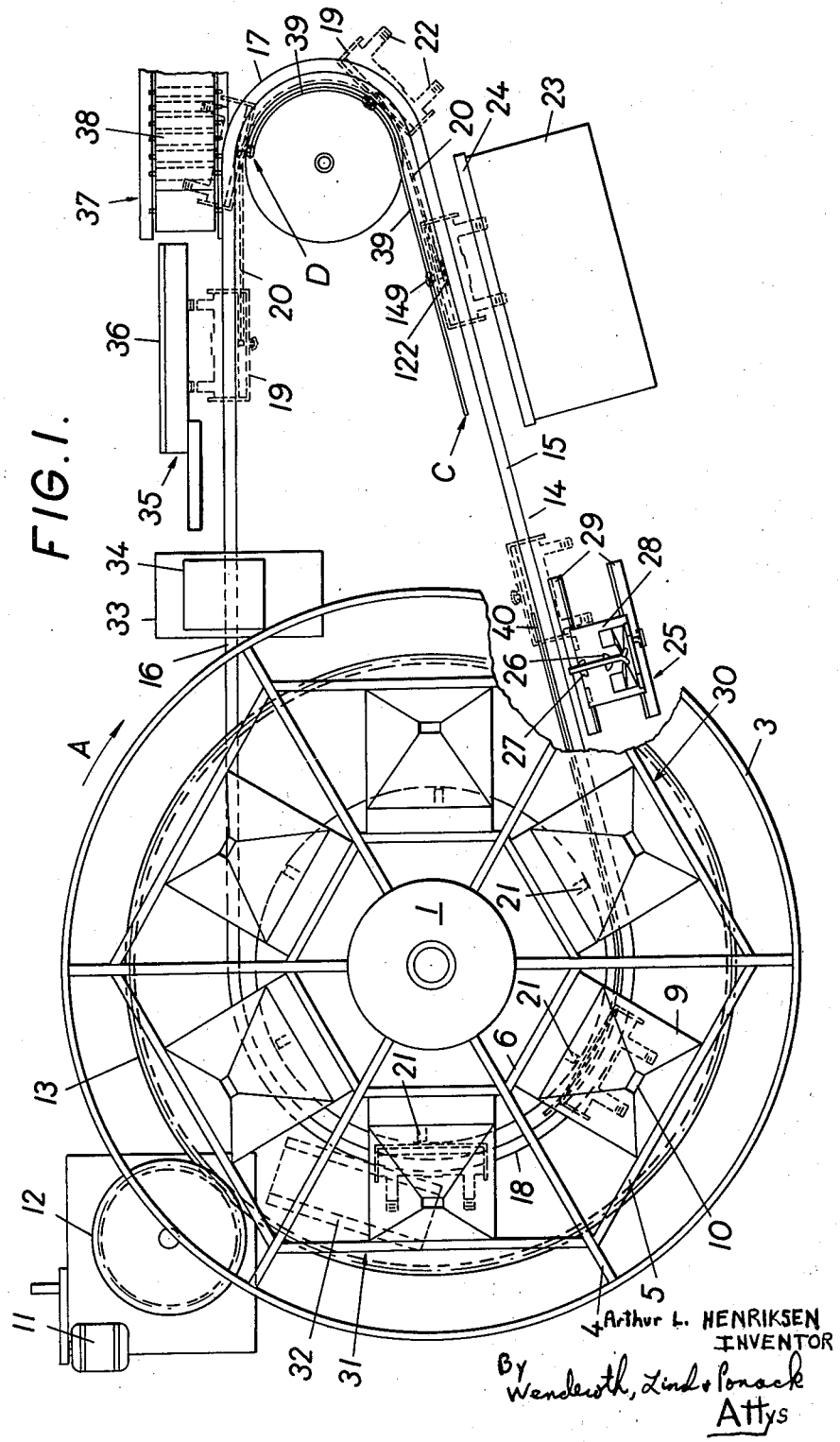
Figure 1 is a diagrammatic plan view of the entire machine.

The general construction of the machine will be described in the following in connection with Fig. 1 and Fig. 2 of the drawings. In these figures, 1 represents a vertical column arranged rotatably about its axis and carrying on its top portion a reservoir 2 for the goods to be filled into the bags. The column is rigidly connected with a frame structure 3 comprising a number—in the drawing six—of radial supporting beams 4 connected by girders 5 and 6. The frame structure 3 carries several automatically acting dispensing devices 7 into which the goods to be packed into bags are fed from the reservoir 2 through funnels 8. Below each dispensing device 7 is placed a hopper 9, said hopper receiving from the dispensing device weighed portions of the goods to be packed and delivering the goods to the bags, the bags being brought singly into position below the discharge nozzles 10 of the hopper. Fig. 2 shows a bag 10a in filling position below a hopper.

The frame construction 3 with the reservoir 2 as well as the construction of the automatic dispensing devices 7 are known per se and are not described in detail as they do not form a part of the present invention. The hoppers 9 are suspended on vertically rotatable arms 9a so that they can be lifted and lowered by a mechanism which is not shown here but which may consist of a vertically movable bar having at its lower end a roll with which it rests against a guiding cam.

Figure 2:
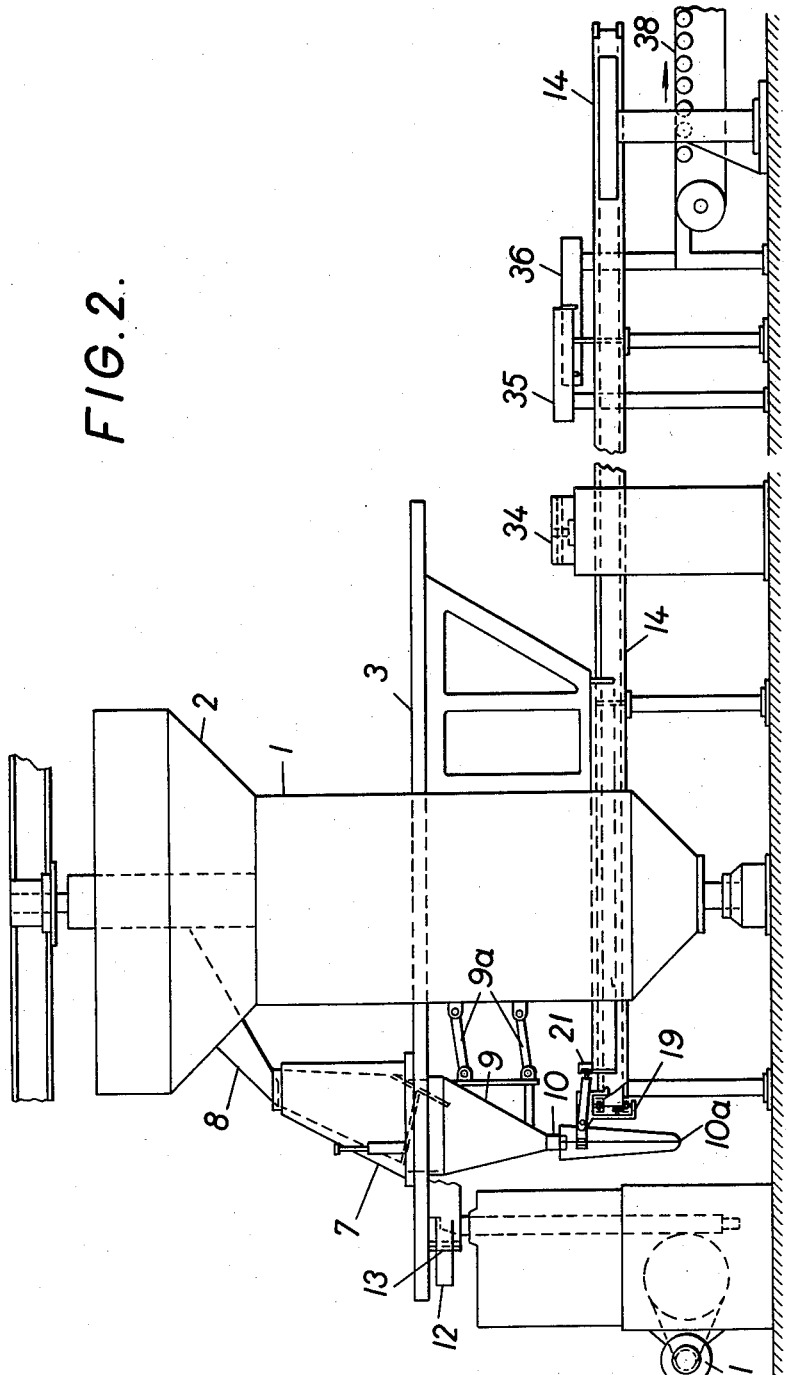
Figure 2 is a similar side elevation, partly in section with certain parts omitted.

When the machine is in operation the entire frame construction and the parts fastened to it, are evenly rotated in a direction shown by the arrow A on Figure 1 by a motor 11 which by a suitable coupling and reducing device is connected with a gear-wheel 12 engaging a bull gear 13, secured to the frame construction 3.

Figure 5:
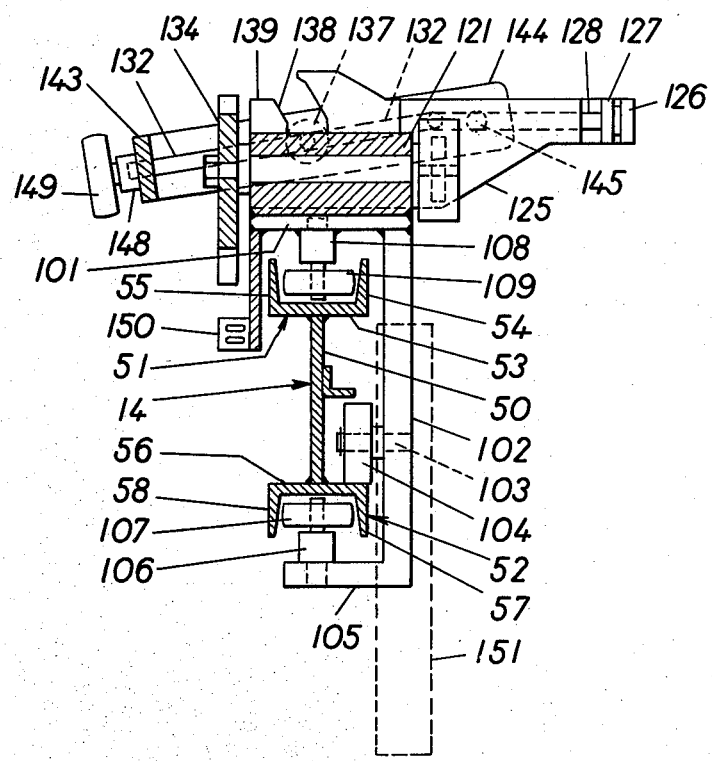
Figure 5 is a section on the line V—V of Figure 4.

14 represents a rail extending in a horizontal, closed, longitudinal path and composed of two straight sections 15 and 16 and of two circular sections 17 and 18. The circular section 18 extends concentrically around the column 1 somewhat inside the nozzles 10 of the hoppers 9. The rail 14, the profile of which is shown in Fig. 5, serves as a travelling rail for a number of trucks 19, said trucks being connected by chains 20 thereby forming a continuous chain.

The chain construction 3 is provided with lugs or radial projections 21 engaging the trucks 19, said trucks thereby being drawn around by the frame construction 3. The trucks, the construction of which shall be described in more detail in connection with Figs. 3–6, are provided with clamps 22 gripping the bags to be filled.

Alongside the rail 14, there are arranged various stations adapted for acting on the trucks 19 and clamps 22 and for treating the bags which are suspended in the holders. There are essentially provided the following stations:

I. 23 is a station or a work platform for the inserting of empty bags into the clamps. This inserting is assumed to take place manually in the embodiment shown in the figures, but it can also take place mechanically. The trucks arrive at this station with the clamps in the open position and the clamps are automatically locked when the truck has passed the platform 23. 24 is a horizontal board arranged at some height above the clamps and adapted to keep the bags at the correct vertical height when they are inserted into the clamps.

The opening and locking of the clamps will be described later in connection with the detailed description of the trucks (Figs. 3–6).

II. 25 is a station for opening the flat empty bags. This opening is accomplished by the action of suction tubes 26 and 27 arranged in such a way as to be brought together after a bag has come into position between them, whereafter they are moved apart, the clamps 22 meanwhile being brought together automatically. The suction tubes 26 and 27 are located on a carriage 28 travelling upon rails 29 in such a way that during the opening operation it can follow the forward movement of the bag.

III. 30 is a station for the filling of the bags. The filling is done by releasing or opening the dispensing device 7 when said device during its rotation with the frame structure 3 arrives in the position shown in Fig. 2.

IV. 31 is a station for shaking of the bags in order to pack together the material inserted into the bags. The shaking is performed by a shaking device 32 to be described later in connection with Figs. 11 and 12.

V. 33 is a station for the sealing of the bags. This is done for example by a sewing machine 34.

VI. 35 is a station for the sealing of the upper edge of the bag in a vapor tight manner using for example a wax bath 36. After the bag has passed this bath, the packing of the bag is completed and said bag passes now to VII, a station 37, where the clamps open and the bags are transferred to a conveyor 38 to transport the ready made bags onto a pier or loading ramp.

The truck with the bag holder

The truck with the bag holder will now be described in connection with Figs. 3–6. As stated before, a number of trucks with bag holders coupled together to form a continuous chain are used with the machine according to this invention. All the trucks are identical, it is therefore only necessary to describe one of the trucks.

Every truck is disposed symmetrically around its transversal central plane, and to simplify matters there will be described in detail in the following only the right half shown in Fig. 3.

The trucks travel upon the rail 14. The profile of this rail can be clearly seen in Fig. 5. The rail comprises a vertical web 50, U-channels 51 and 52 respectively being secured to the top and bottom of the web. The profile 51 is composed of a web 53 and parallel flanges 54 and 55. The profile 52 consists correspondingly of a web 56 and flanges 57 and 58.

The truck itself consists essentially of a baseplate 101 to which are secured two descending vertical legs 102. 103 (Fig. 5) is a bearing bolt secured to each supporting leg 102 at some distance from its lower end. On the bearing bolt 103 is rotatably mounted a caster 104, and by means of this caster the truck may travel with the wheels running on the upper part of the web 56 upon the lower U-channel of the rail.

Each supporting leg 102 carries on its lower end a horizontal inward arm 105, provided adjacent its internal end with a vertical stub shaft trunnion 106, a guiding wheel 107 having a somewhat smaller diameter than the internal distance between the flanges 57 and 58 being rotatably mounted on this trunnion. The guiding wheel 107 normally rests against the inner side of the flange 58, and its purpose is to guide the truck in such a way that it cannot turn over.

On the bottom side of the frame structure 101 are secured two stub shafts 108, and on each of these shafts is rotatably mounted a guiding wheel 109, normally resting against the interior side of the flange 54 and adapted also to prevent the turning over of the truck.

Figure 3:
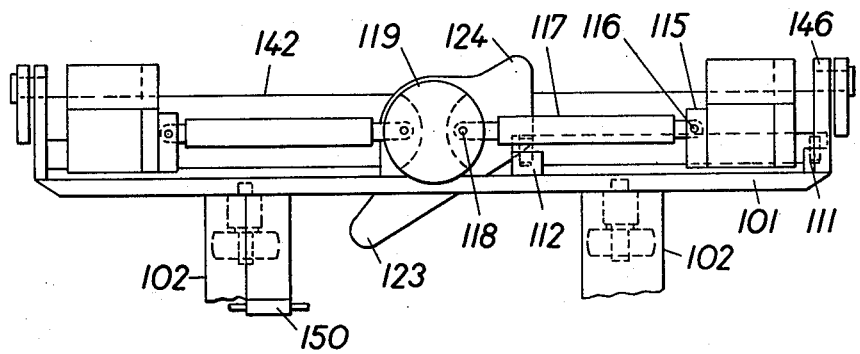
Figure 3 is an enlarged side elevational view of a truck with a bag holder.
Figure 4:
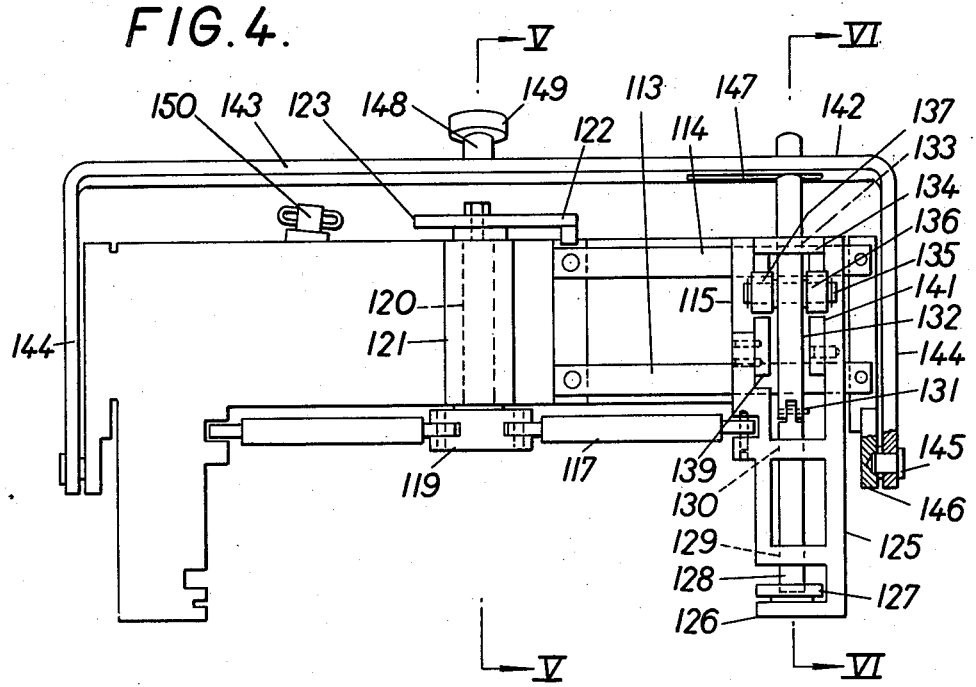
Figure 4 is a similar plan view, partly in section.
Figure 6:
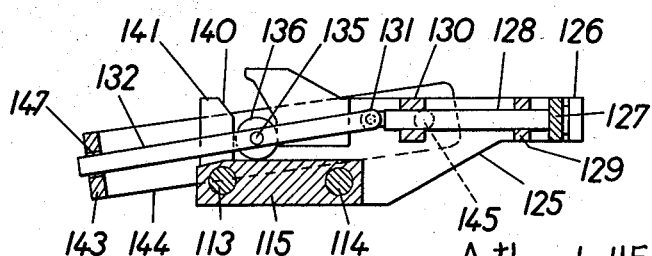
Figure 6 is a section on line VI—VI of Figure 4.

The baseplate 101 is provided on its upper surface at each end with a transverse elongated element 111 (Fig. 3). Corresponding elongated elements 112 are arranged adjacent the center of the baseplate. These elongated elements 111 and 112 serve as a fitting for the sliding bolts 113 and 114 (Fig. 4). Slidingly mounted on these sliding bolts is a slide casing 115 (Fig. 6). The slide casing 115 is articulated at 116 on an arm 117, the other end of this arm being articulated at 118 on a disc 119 secured to the front end of a shaft 120 (Figs. 3 and 4). The shaft extends horizontally transversely of the baseplate 101 and is rotatably mounted in a housing 121. The shaft 120 carries at its other rear end a cam disc 122 with two lifting cams 123 and 124. As shall be shown in detail, these cams are adapted to rotate the shaft 120 and to displace the slide casing 115, said casing thereby adopting the position shown in Figs. 3 and 4 or a position where the casing is moved closer to the center of the baseplate, said baseplate sliding on sliding bolts 113, 114 (see Figs. 4 and 6).

A supporting arm 125 furnished at one end with a jaw 126 pointing towards the center of the truck is secured to the slide casing. A second jaw 127, cooperating with and corresponding to the jaw 126, is secured to the outer end of a rod 128 axially slidable in bearings 129 and 130. The rod 128 is linked at its rear end at 131 to a shaft 132. The shaft 132 extends through a vertical slot 133 in a plate 134 secured to the slide casing at the rear end of the slide. The shaft 132 is furnished with a bolt 135 leading therethrough and carrying oppositely disposed rollers 136 and 137, respectively. The roller 137 is located in a slanting guide 138 arranged in a plate 139 fixed to the slide casing. The roller 136 is located in a similar guide 140 extending parallel to the guide 138 and arranged in a plate 141 which also is secured to the slide casing 115 and extends parallel to the shaft 132.

142 (Fig. 4) is a lever rack, the central part of which, 143, extends in the entire length of the truck at its rear, while the lever arms 144 extend forwardly parallel to the shaft 132.

145 is a bolt at the front end of each lever arm 144, the lever rack being rotatably mounted on these bolts fixed to a plate 146, rigidly connected to the baseplate 101 or the elongated element 111 at each end of the baseplate.

147 is a longitudinal slot in the center part 143 of the rack. The rear end of the shaft 132 is located in the slot 147. To the center part 143 of the rack at the rear side is secured a bearing bolt 148 carrying a rotatably mounted roller 149. 150 represents a chain fastening secured to the baseplate 101, by means of which the truck can be coupled together with a preceding and a succeeding truck.

The operation of the truck and bag holder is as follows: Immediately before placing a bag in the holder, the lever rack 142 is lifted from the position shown in Figs. 3–6 into an approximately horizontal position. This is accomplished by the roller 149 coming into engagement with a cam 39, see Fig. 1. An upward swinging movement of the rack causes the guide rollers 136, 137 to move in the guides 138 and 140, and because these guides slant upwardly and rearwardly, the shaft 132 and thus the rod 128 are displaced rearwardly, resulting in the jaw 127 being pulled away from its engagement with the jaw 126. The top edge of a bag can now be put into position between the jaws 126 and 127.

When roller 149 (at C), (Fig. 1) leaves said cam 39, the lever arm returns by the force of gravity into the position shown in Figs. 3–6. The shaft 132, the rod 128 and the jaw 127 return thereby into the position shown in the drawing, the bag being clamped between the jaws 126 and 127.

The slide casings 115 are in their outer position in the position shown in the drawing. In order to fill the bag it must be opened first. This can only occur when the clamped side portions of the bag are simultaneously moved together. This may be done by means of the cam 123. When this cam abuts against a stationary guiding cam 40 (Fig. 1), the disc 122 and thereby the shaft 120 rotate counterclockwise, the arms 117 being thereby drawn inwardly toward the center of the truck. The slide casings 115 are thereby simultaneously drawn inwards so that the clamps 22 at each end of the bag holder are moved inwardly towards each other. When the bag is filled and is ready for being sealed, for instance by sewing, it is necessary to tighten the upper edge once more. This may be done by a special guiding cam (not shown) arranged behind the guiding cam 40 or by springs (not shown) actuating the slide casings.

*The bag opener*

The bag opener shall now be described in connection with Figs. 7, 8, 9 and 10. In these figures, 201 represents a part of the machine bed. Two U-channels 202 and 203 are secured to this bed. Metal wires or rods 204 with a circular cross-section are fastened inside the flanges of the channels.

205 represents a carriage. The carriage is provided with casters 206 running on wires or rods 204 which serve as rails. The carriage carries an upright angular shaped rocker arm 207 rotatably mounted at 207a and provided with horizontal portions 208. 209 is a stop secured to the bed of the machine, the portion 208 abutting against this portion when the carriage is moved to the left in Figs. 7 and 8.

Fig. 9 shows diagrammatically a bag truck T. This truck carries an elongated downwardly extending plate 151, said plate resting against the upper end of arm 207 on the carriage 205 when the truck is being moved. Thereby the carriage will be guided together with the truck to the left in Fig. 8 until the portion 208 abuts against the lug 209, the arm 207 swinging clockwise in Fig. 9 disengaging from the plate 151, and thus releasing the truck.

210 is a cable fastened at one of its ends to the carriage 205 (Fig. 7). The cable 210 is conducted round a pulley 211 rotatably mounted in a stationary bearing. From the pulley 211 the cable passes vertically upward and around a pulley 212 also mounted rotatably in a stationary bearing. On the other end of the cable is suspended a weight 213. 214 is a tubular casing in which the weight 213 can move freely.

The weight 213 causes cable 120 to pull the carriage 205 to the right in Figs. 7 and 8. When a truck with the arm 151 thereon abuts against the arm 207 of the carriage 205, the carriage is moving to the left in Fig. 8, thereby pulling the weight 213 upward into the position shown in Fig. 7. As soon as the arm 207, by abutment of the arm 208 against the lug 209, disengages the arm 151, the weight 213 pulls the carriage to its right outer position.

The carriage carries two swingably mounted rocker arms of which only one, 215, is shown in Fig. 9. The rocker arm 215 is swingably mounted on a shaft 216 longitudinally arranged on the carriage. On the side pointing away from the shaft 216, the rocker arm 215 is provided with a cam roller 217 cooperating with a stationary guiding cam 218. The carriage being in its outer righthand position, the cam roller 217 rests against the elevated portion 218a of the guiding cam, see Fig. 7. The carriage being pulled to the left, the cam roller arrives at a lower portion 218b of the guiding cam, the cam roller being thereby pressed down and the rocker arm 215 swinging to the position shown in Fig. 9.

The rocker arm is secured at its upper end to a tube 219, said tube carrying at its upper end a suction head 220. The other end of the tube 219 is connected by a pipe with a vacuum source.

221 represents a suction head arranged opposite the suction head 220 and secured to the other rocker arm 222 by a tube 223. The rocker arm 222 is not shown in Fig. 9.

The rocker arm 222 is mounted on the same shaft 216 as the rocker arm 215. The rocking movement of the arm 222 is controlled by an arm 215 by using a mechanism shown in Fig. 10. This figure shows only the lower horizontal portions 215a and 222a of the rocking arms 215 and 222 respectively. 224 is a horizontal bearing bolt extending on the bottom side of the carriage 205 in a crosswise direction. Tiltingly arranged on the bearing bolt is an arm 225, connected at its one end by a vertical rod 226 with the horizontal portion 215a of the rocking arm 215. Similarly, the arm 225 is connected at its other end by a rod 227 with the horizontal portion 222a of the arm 222. This mechanism causes the swinging of the rocker arm 222 in an opposite direction to the swinging movement of the arm 215. The two suction heads 220 and 221 will thus during the to-and fro-motion of the carriage 205, move towards each other, or away from each other.

The operation of the bag opener is as follows:

When a truck with a bag suspended in the bag holder approaches the bag opener, this opener is positioned in its right end position where it is kept by the weight 213. The roller 217 is situated at the right end of the guiding cam 218 in Fig. 7, and the arm 215 is kept in the position shown in Fig. 9. The suction heads 220 and 221 occupy the positions shown in Fig. 9, the bag which is suspended in the bag holder upon the truck being thereby inserted between the suction heads.

When the truck arrives at the bag opener, it is taken along, as explained above, by the arm 151 secured to the truck and abutting against the upper end of the arm 207 on the carriage 205.

When the cam roller 217 arrives at the elevated portion 218a of the guiding cam 218, the arm 215 is moved by a spring, not shown in the drawing, against the bag, while the arm 222 at the same time is pivoted in the opposite direction by the mechanism shown in Fig. 10. The suction heads 220 and 221 are moved towards each other until they abut against the opposite sides of the bag S near the top of said bag. The suction pipes are at the same time connected with a vacuum source, the suction heads thereby being sucked to the opposite lateral walls of the bag.

The movement of the truck and the carriage 205 continuing, the cam roller 217 arrives at the left side (Fig. 7) of the elevated portion 218a of the guiding cam 218, and the arm 215 is pivoted to the position shown in Fig. 9 against the action of the spring.

The arm 222 is pivoted by the mechanism shown in Fig. 10 in opposite direction, whereby the suction heads again are brought to the position shown in Fig. 9, in which the suction heads move the opposite lateral walls of the bag apart, the bag being thereby opened. The movement of the truck continuing, the opened bag is conveyed to a point directly below the discharge mouth 10 of a hopper 9, at which point the arms 9a are lowered, whereby the discharge mouth 10 is lowered into the bag. The vacuum source to the suction heads is now disconnected at the same time as the suction pipes are connected to the surrounding air, thus releasing the suction heads from the bag. Simultaneously, the portion 208 of the arm 207 abuts against the guiding cam 209, whereby the upper end of the arm 209 is moved out of engagement with the lower end of the arm 151 and the carriage 205 is pulled back by the weight 213 to its initial position.

The valve or the valves which close or open the connection between the suction pipes and the suction heads 220 and 221 and the vacuum source or the surrounding air may be controlled mechanically or electrically. The controlling means may be of various constructions. Being known per se they are not disclosed in detail and are not shown in the drawing.

*The shaking apparatus*

Figure 11:
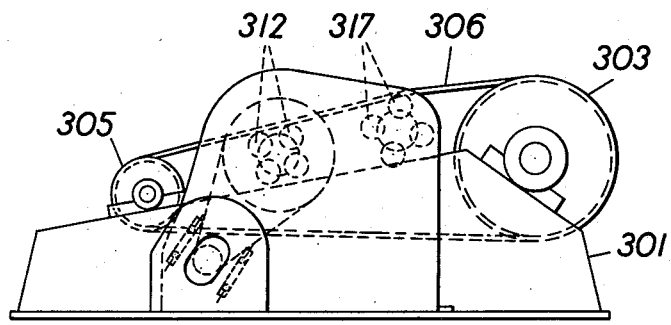
Figs. 11 and 12 are a plan view and a front view respectively of a shaking apparatus.
Figure 12:
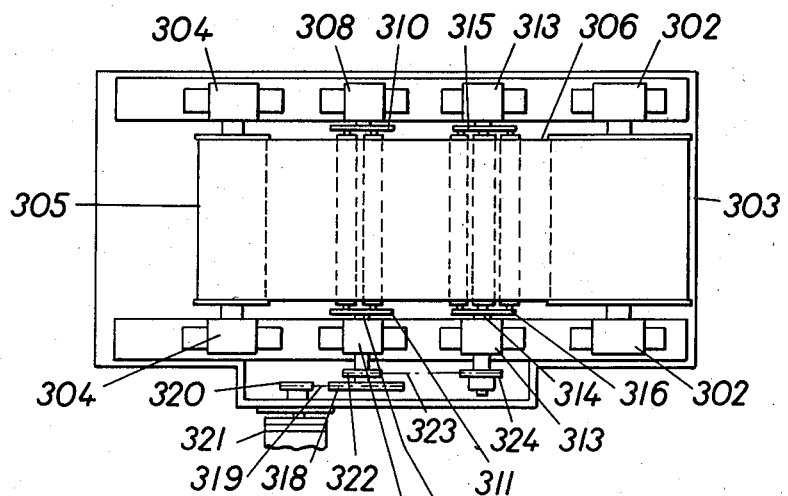

Figs. 11 and 12 show a shaking apparatus adapted to shake the filled bags causing the goods to be tightly packed. In the figures, 301 represents a stationary frame for the shaking apparatus. 302 represents two bearings arranged on the frame for the pivoting of a roller 303. 304 represents two bearings located on the other end of the frame for the pivoting of a roller 305. A belt 306 runs around these rollers.

308 represents bearings for the pivoting of a shaft 309 disposed between the rollers 303 and 305. Circular discs 310 and 311 respectively are secured to the shaft on each side of the belt 306. On these discs are pivoted four rollers 312. These rollers are symmetrically arranged around the axis of the shaft 309 in such a way that they will slap against the bottom side of the belt 306 during the rotating movement of the shaft and thus of the discs 310 and 311, and lift the belt.

Also arranged on the frame are two bearings 313 for the pivoting of the shaft 314 to which there are also secured two circular discs 315 and 316, a disc being located on each side of the belt 306. These discs carry, in a manner similar to the discs 310 and 311, four symmetrically arranged rollers 317 placed and dimensioned in such a way that they will abut against the bottom part of the belt 306 because of the rotating movement of the shaft 314 and thus of the discs 315 and 316, and lift the belt.

A pulley 318 is secured to one end of the shaft 309, said pulley being connected by a belt 319 to a pulley 320 secured to the shaft of a motor 321. The shaft 309 is further furnished with a pulley 322, said pulley being connected by a belt 323 to a pulley 324 secured to the shaft 314.

The shaking apparatus operates as follows:

The motor 321 rotates the shafts 309 and 314 in the same direction, e.g. clockwise in Fig. 11. The shaking apparatus is arranged in such a manner, see Fig. 1, that after the bags are filled and while they are suspended in the bag holders, they are conducted above the shaking apparatus. This apparatus is located at a suitable elevation so that the bottom of a moving bag hits the belt 306 at the spot where the roller 305 is situated or shortly after this roller, the bag moving from left to right in Fig. 11. The belt 306 rotates clockwise in frictional contact with the bag. In the same time the rollers 312 and 317 abut against the bottom side of the belt so that the belt is raised and lowered in quick succession, and simultaneously the bag is conducted towards the roller 303.

*Sealing apparatus*

The sealing apparatus is indicated generally by the numeral 34. It may consist of a sewing machine of conventional construction, but it should be mounted in such a manner that the sewing head can move reciprocally in the longitudinal direction of the seam.

The materials being sewn together in a sewing machine generally advance intermittently, the movement being arrested when the needle engages the material and moving thereafter a short distance, corresponding to the length of the stitch when the needle is out of engagement with the material.

With a bag filling machine according to the present invention where the filled heavy bag is suspended in a bag holder secured to a truck drawn at an even speed upon a stationary rail, it is not possible to impart an intermittent movement to the upper edge of a bag to be sewn. If a conventional sewing machine is mounted stationarily, the needle will quickly break because the rigid material in the bag will advance with great force transverse to the needle during the period when the needle engages the bag. If the needle is so strong that it does not break, it will tear up the bag and no satisfactory seam can thus be obtained.

It is therefore important to mount and operate the sewing machine in such a way that the sewing head may move with the needle to and fro longitudinally of the seam.

While there are illustrated and described herein the particular features of a preferred embodiment of the invention, the invention shall not be limited to the exact structural details thus illustrated and described. Many of these details are known and may be modified. The invention relates to the described combination and covers all forms and details within the terms employed in the difinitions of my invention constituting the appended claims.

I claim:

1. Machine for packing of powdered or granulated goods into bags, comprising a frame construction mounted rotatably around a vertical axis, said frame construction bearing an upper, centrically arranged supply container for the goods to be packed and provided with a number of discharge funnels for the goods, an automatically working dispensing device arranged below each funnel and carried by the frame construction, a hopper arranged below said device and carried also by the frame construction, said dispensing device adapted to feed the goods in portions of predetermined weight to said hopper, the goods being able to flow downwardly from the lower discharge mouth of said hopper into a bag located below the hopper, a sealing apparatus for the filled bags and a conveyor for the bags, said conveyor comprising a series of trucks connected with each other to form an endless truck chain, a rail adapted to carry the trucks in a closed, longitudinal path, each truck being provided with a bag holder comprising two clamps located in about the same height, said clamps being adapted to move parallelly to the travel direction of the trucks, from an outer position in which their reciprocal distance is somewhat shorter than the width of a bag to be filled, to an inner position in which their reciprocal distance is considerably smaller, said clamps being adapted to grip, in their outer position, a bag inserted with its opposite lateral edges in the clamps, said bag holder being further provided with mechanisms adapted to open and to close the clamps and to move the clamps towards each other and away from each other, and fixed guiding cams located in the vicinity of the rail and adapted to cooperate with said mechanisms, the entire construction working in such a way that a bag being fastened in a holder will be conducted by the truck below one of the said hoppers with the clamps in their inner position, and that after it is filled with goods of predetermined weight, said bag, in order to be permanently closed, will be conducted further by the truck to said sealing apparatus with the clamps in their outer position, the bag being suspended in the clamps both during the filling operation and the sealing operation.

2. Machine according to claim 1, comprising a bag opener located directly in front of the place where the bag holder is being introduced below a hopper, said bag opener being adapted to open a bag which is suspended in clamps located on a truck.

3. Machine according to claim 1, comprising a bag opener movably arranged in the travel direction of the truck in the vicinity of the place where the bag holder is being introduced below a hopper and adapted to be pulled along by an arriving truck until said bag has come into position below a hopper and thereafter to be automatically returned to its initial position, said bag opener being adapted to open a bag which is suspended in clamps located on a truck.

4. Machine according to claim 1, comprising a shaking device arranged below the truck chain between the place where the bags are being filled and the sealing apparatus and disposed in such a height in relation to the trucks that a filled bag which is suspended in the clamps engages with its bottom the shaking device, the goods being thereby shaken and packed together in the bag.

5. Machine according to claim 1, comprising a conveyor for conveying filled and sealed bags and a fixed guiding cam adapted to open the clamps and arranged in such a manner that the bag is being released when it arrives into position above the conveyor.

6. Conveying device for bags, said conveying device comprising a number of trucks connected with each other to form an endless truck chain and a rail adapted to carry the trucks in a closed, longitudinal path, each truck being provided with a bag holder comprising two clamps located approximately in the same height, said clamps being adapted to move in parallel to the travel direction of the trucks, from an outer position in which the reciprocal distance of the clamps is somewhat shorter than the width of a bag being filled, to an inner position in which the reciprocal distance of the clamps is considerably smaller, said clamps being adapted to grip in their outer position a bag being inserted with its opposite lateral edges in the clamps, the bag holder being further provided with mechanisms adapted to open and to close the clamps and also to move the clamps towards each other and away from each other, and a number of fixed guiding cams located near the rail and adapted to cooperate with said mechanisms, said guiding cams working in such a way that a bag suspended in a bag holder is being conducted by the truck to a filling station with the clamps in their inner position, and after filling to a sealing station with the clamps in their outer position, the bag being suspended in the clamps both during the filling operation and the sealing operation.

7. A conveying device as claimed in claim 6 in which each truck is provided with wheels to move it along the rail as well as with guiding rollers adapted to rest against vertical guiding flanges on the rail in order to prevent the truck from turning over upon the rail because of the weight of a bag suspended in the bag holder.

8. A conveying device according to claim 6, wherein each truck comprises a horizontal base plate arranged in the travel direction of the truck, vertical, descending and spaced supporting legs secured to the base plate, a caster arranged on each of said supporting legs, a guiding roller arranged for rotating movement about a vertical axis and located at the lower end of said supporting legs and a guiding roller arranged for rotating movement about a vertical axis and mounted on the bottom side of the base plate.

9. A conveying device according to claim 6, wherein each truck comprises two slide casings slidingly mounted lengthwise of the truck, said slide casings each carrying one of the clamps of the bag holder.

10. A conveying device according to claim 6, wherein each truck comprises a horizontal, rotatably mounted shaft extending transversely of the base plate, a cam disc secured to the shaft at its rear end and adapted to cooperate with a stationary guiding cam, a disc secured to the shaft at its other end, two slide casings slidingly mounted lengthwise of the truck, each slide casing carrying one of the clamps of the bag holder, and two rods, each of said rods being at one end link connected with the corresponding slide casing and at the other end with said disc, the rotating movement of the shaft in opposite directions causing the slide casings to move toward each other and away from each other respectively.

11. A bag holder comprising a horizontal elongated base plate, a horizontal rotatably shaft extending transversely of the base plate, a cam disc secured to the shaft at its one end and adapted to cooperate with a stationary guiding cam, a disc secured to the shaft at its other end, two slide casings mounted on the base plate for sliding movement lengthwise of the base plate, each of said slide casings carrying a clamp adapted to grip a bag, and two rods, each of said rods being at one end pivotably connected with the corresponding slide casing and at its other end with said disc, the slide casings moving thereby toward each other or away from each other, an arm secured to each slide casing and extending transversely of the base plate, said arm being provided at its one end with a vertical jaw extending lengthwise of the base plate, and a jaw arranged on each slide casing and movable with respect to the aforementioned jaw, the latter jaw adapted to cooperate with the former jaw in order to clamp the bag.

12. Bag holder according to claim 11, comprising a lengthwise movable rod arranged on each slide casing parallelly to said arm, the movable jaw being secured to one end of said rod.

13. Bag holder according to claim 11, comprising a lengthwise movable rod arranged on each slide casing in parallel to said arm, the movable jaw being secured to one end of said rod, a bolt arranged in continuation of the rod at its other end, said bolt being hingedly connected with the rod, a rotatable guiding roller secured to each side of each bolt, two parallel plates secured to each slide casing and extending transversely of the base plate, a guide for one of said guiding rollers being arranged in each of said plates, said guides extending slantingly upwards away from the jaws.

14. Bag holder according to claim 11, comprising a lengthwise movable rod arranged on each slide casing parallelly to said arm, the movable jaw being secured to one end of said rod, a bolt arranged in continuation of the rod at its other end, said bolt being hingedly connected with the rod, a rotatable guiding roller secured to each side of each bolt, two parallel plates secured to each slide casing and extending transversely of the base plate, a guide for one of said guiding rollers being arranged in each of said plates, said guides extending slantingly upwards away from the jaws, a U-shaped lever rack with its central web extending in the entire length of the base plate, while the lever arms extend in parallel to said vertical plates, said lever rack being swingably mounted about an axis extending lengthwise of the base plate, said lever rack being further provided in its central web with a longitudinal slot corresponding to each of said bolts, the rear end of each bolt passing through the slot, the pivoting of the rack lever causing the bolts to pivot upwardly and rearwardly because of their location in the slanting guides.

15. A machine according to claim 4, in which said shaking device comprises an endless conveyor, two parallel, spaced, rotatably mounted turning rollers, the horizontal axis of said rollers extending approximately vertically to the travel direction of the truck, the endless conveyor being conducted round these rollers, a shaft arranged between the turning rollers in parallel to these rollers, a number of rollers arranged symmetrically round the shaft, said rollers being carried by the shaft and being adapted to rotate round the axis of the shaft and to abut thereby against the bottom side of the upper flight of said endless conveyor chain, lifting thereby somewhat said conveyor chain and shaking the bags conducted by the trucks on the endless conveyor chain.

16. A machine according to claim 1, in which said sealing apparatus consists of a sewing machine, the sewing head of said sewing machine being adapted to move to and fro lengthwise of the seam.

References Cited in the file of this patent

UNITED STATES PATENTS

| 1,454,060 | Lane et al. | May 8, 1932 |
| 2,160,059 | Cundall | May 30, 1939 |
| 2,362,462 | Belcher et al. | Nov. 14, 1944 |
| 2,649,674 | Bartelt | Aug. 25, 1953 |